United States Patent [19]

Burwasser

[11] 4,262,053

[45] Apr. 14, 1981

[54] ANTI-BLOCKING MEANS FOR DIELECTRIC FILM

[75] Inventor: Herman Burwasser, Boonton, N.J.

[73] Assignee: GAF Corporation, New York, N.Y.

[21] Appl. No.: 943,720

[22] Filed: Sep. 19, 1978

[51] Int. Cl.[3] .......................... B32B 5/16; B32B 27/06

[52] U.S. Cl. .................................... 428/327; 428/483; 428/516; 428/910; 430/67

[58] Field of Search ............... 428/328, 330, 323, 414, 428/418, 458, 461, 463, 483, 500, 538, 910, 516-520, 327

[56] References Cited

U.S. PATENT DOCUMENTS

| | | | |
|---|---|---|---|
| 3,179,544 | 4/1965 | Smith-Johannsen | 428/323 |
| 3,227,576 | 1/1966 | Van Stappen | 428/327 |
| 3,770,482 | 11/1973 | Millar et al. | 428/323 |
| 4,074,000 | 2/1978 | Hankee et al. | 428/323 |
| 4,139,675 | 2/1979 | Nagai et al. | 428/323 |

*Primary Examiner*—William R. Dixon, Jr.
*Attorney, Agent, or Firm*—James Magee, Jr.

[57] ABSTRACT

Dielectric films comprising a support member which is capable of acquiring an electrostatic charge on passing through toner pick up toner randomly which is not fixed during development. The unwanted toner pick up is minimized by applying a coat of anti-static material and/or a toner fixing resin to the uncoated back of the support. The present invention improves blocking characteristics of dielectric film by modifying the surface by means of adding particulate materials to the final coat on one or both surfaces of the support.

3 Claims, No Drawings

ANTI-BLOCKING MEANS FOR DIELECTRIC FILM

BACKGROUND OF THE INVENTION

It is well known that film supports such as heat-set, biaxially-oriented linear polyesters have a tendency to pick up electrostatic charges when being moved with respect to other objects such as the transport means and transport rollers and other parts of the hardware with which it is used. A film support so charged, when exposed to toner, particularly liquid toner, the liquid of which is insulating, picks up a random background of toner. Toner picked up in this manner is adhered only lightly. When handled, or brushed against by clothing an unpleasant smudge results. The greater the static charge the greater amount of the weakly adhered toner is present which becomes available as a threat to ones clothing. A further problem is that in the case of a transparent electrostatographic recording element too great a toner pick up provides so much background or fog that the amount of information supplied by the imaged surface is diminished. Solutions to this problem have been described in my concurrently filed applications Ser. No. 943,714 and Ser. No. 943,721, both filed Sept. 19, 1978.

SUMMARY OF THE INVENTION

The tendency of the non-conductive film support of an electrostatographic recording element to pick up toner is reduced or eliminated by applying to the uncoated side of the support an anti-static compound or composition and/or a toner fixing resin. These remedies give rise to the problem of blocking or sticking of rolls or stacks of film to themselves in many instances.

DESCRIPTION OF THE PREFERRED EMBODIMENTS

Dielectric films prepared in accordance with the teaching of my concurrently filed applications Ser. No. 943,714 and Ser. No. 943,721 have extremely smooth surfaces. These characteristics result in the film blocking or sticking to itself particularly after it has been rolled or stacked for several days or more.

It was observed that there was less tendency to block in the case of a dielectric film which had been provided with a matting material of ground silica included in a binder of dielectric resin. This produces a film which is translucent but not transparent.

High density polyethylene particles have been suggested as an anti-blocking agent and as an opacifying agent in some cases. It is the object of the present invention to eliminate problems of blocking or sticking without loss of transparency of the dielectric film because of the anti-blocking agent used.

The requirement of the present invention is that the anti-blocking agent be capable of being held by a binder resin which is particularly useful when it is also a toner-fixing resin and which does not impair or diminish the transparency of the dielectric film.

A preferred anti-blocking agent which gives particularly good results is a particulate high density polyethylene product commercially available from the Allied Chemical Company called Polymist® which comes in various particle sizes.

The dielectric imaging element may be of the type described in my concurrently filed applications Ser. No. 943,714 and Ser. No. 943,721 which are directed to minimizing or eliminating unwanted toner pick up on the back surface of the film support and the smudging or soiling resulting from the presence of unfixed toner.

A preferred dielectric film element comprises a heat set, biaxially oriented liner polyester of about 75 to 175 micrometers thick. The support has a conductive layer having resistivity values less than $10^{10}$ ohms/square and preferably less than $10^{8}$ ohms/square. The conductive layers may be polymers such as sulfonated polystyrene, quaternized polymers of vinyl pyridine with aliphatic esters, polymers of polyacrylic acid salts or metallic coated polyester films and the like.

A dielectric resin is coated over the conductive layer to complete the imageable dielectric element. Suitable dielectric resins include styrenated acrylics, polyolefins, alkyd resins, polyester resins, polyvinyl resins, cellulose acetates, epoxide resins, copolymers of the above shellacs and the like.

A conductive composition was prepared by dissolving 50 g of sulfonated polystyrene in 50 ml of water which contained 3 drops of a surfactant Duponol G. This was coated on a terephthalic acid polyester of ethylene glycol film of about 76 micrometers thick.

A dielectric film element was made as follows: 33 g of styrenated acrylic resin (DeSoto-315, a product of the DeSoto Company of Des Plaines, Illinois) was dissolved in 67 g of toluene. The solution had a viscosity of about 50 cps. It was coated over the conductive layer using a #10 wire wound bar.

The dielectric film was then cut into two rolls.

A toner fixing resin composition was prepared by dissolving 10 g of styrenated acrylic resin (DeSoto-315) in 90 g of methyl isobutyl ketone. This was coated on the back surface of one roll using a #10 wire wound bar.

A second batch of toner fixing resin was prepared as above. 0.1 g of Polymist® A-12, (a product of Allied Chemical) a particulate high density polyethylene having a size range of 2 to 40$\mu$ and an average of 12$\mu$ powder was dispersed therein by stirring which was 1% by weight of the dry solids content. This composition was coated on the back surface of the second roll of dielectric film using a #10 wire wound bar.

Both films were cut into squares, stacked under a sixteen pound weight and stored at ambient conditions for over 30 hours. The film with the toner fixing resin alone was partially stuck together and when peeled apart showed several parts of the surface coating picked off by the adjacent surface of the film. The toner fixing resin containing the particulate polyethylene did not block or lose any of its surface to adjacent film surfaces.

The anti-blocking effect of the addition of particulate polyethylene was demonstrated using coatings containing ½ and 2% by weight of dry solids also.

Pick-off of any essential part of the dielectric coating is shown by exposing the entire surface of the element, toning and developing it. Pick-off due to blocking appears usually as bare spots on the otherwise evenly toned film.

It will be understood that the foregoing examples were given by way of exemplification and not by way of limitation. Workers skilled in the art of electrostatographic copying will be aware of several variations suggested by the teaching of the present application and which are within the spirit of the appended claims.

What is claimed is:

1. In a transparent dielectric imaging member for receiving a latent electrostatic image comprising a transparent dielectric film support, a transparent conductive layer carried on one surface of said support, and a dielectric layer carried on top of said conductive layer; the improvement which consists of providing a back coating on the surface of said film support opposite the conductive layer comprising particulate high density polyethylene and a binder, said polyethylene particles being present in an amount of from about 0.5 to about 2.0 percent by dry weight of said back coating and having a particle size ranging from 2 to 40 microns.

2. The dielectric imaging member of claim 1 wherein the amount of particulate polyethylene is about 1 percent by weight of the dry solids content of the back-coating.

3. The dielectric imaging member of claim 1 wherein the dielectric film support is a heat set biaxially oriented linear polyester.

* * * * *